United States Patent [19]
Spencer

[11] 3,899,958
[45] Aug. 19, 1975

[54] FLUID-PRESSURE ROTARY MACHINES

[75] Inventor: Kenneth Morgan Spencer, Coventry, England

[73] Assignee: Newage Engineers Limited, Lincolnshire, England

[22] Filed: Aug. 15, 1973

[21] Appl. No.: 388,622

[30] Foreign Application Priority Data
Aug. 16, 1972  United Kingdom............... 38265/72
Aug. 16, 1972  United Kingdom............... 38264/72

[52] U.S. Cl.................................... 91/492; 91/498
[51] Int. Cl............................................. F01b 13/06
[58] Field of Search............. 91/488, 491, 492, 498

[56] References Cited
UNITED STATES PATENTS
2,556,717   6/1951   Benodek............................ 91/498
3,783,748   1/1974   Conningham....................... 91/488

FOREIGN PATENTS OR APPLICATIONS
1,947,585   11/1970   Germany........................... 91/491

*Primary Examiner*—William L. Freeh
*Assistant Examiner*—O. T. Sessions
*Attorney, Agent, or Firm*—Cushman, Darby & Cushman

[57] ABSTRACT

A rotary hydrostatic pump or motor of the radial piston and cam ring type has cam follower rollers rotatably housed in plain bearings in recesses formed in the outer ends of the pistons. Each plain bearing shell backed by the skirts of the piston extends around more than half of the circumference of the roller, its extremities subtending an angle more than 180° but less than 360° at the roller axis, so as to retain the roller in the piston recess in the direction of piston reciprocation. To provide positive endwise location of the rollers, these are trapped between guide rings which are axially-retained on the cylinder block but are freely rotatable thereon so as to reduce rubbing friction with the rollers. In the case of a machine having two banks of radial cylinders, three guide rings only are used to locate the two banks of follower rollers, the two outer guide rings being axially-retained on the cylinder block outside the rollers and the third guide ring acting as a spacer between the two banks of rollers.

5 Claims, 3 Drawing Figures

FLUID-PRESSURE ROTARY MACHINES

This invention relates to rotary hydraulic machines, both motors and pumps, which are operated by or generate hydrostatic fluid pressure and are of the piston type comprising a cylinder block and an annular cam track which surrounds the cylinder block, the cam track being rotatable relatively to the cylinder block or vice versa, and reciprocating pistons slidable in generally radial directions in cooperating cylinders in the block and coacting with the cam track.

Such a machine is sometimes termed a hydrostatic motor or a hydrostatic pump, as the case may be, being a positive-displacement machine which operates by virtue of hydrostatic pressure rather than by hydrodynamic action.

In a known construction of a hydrostatic motor or pump of this type, each piston carries at its outer end a cylindrical or slightly barrel-shaped follower roller rotatably supported in a bearing recess in the outer end of the associated piston, in rolling engagement with the surrounding cam track.

It is necessary to provide these follower rollers with positive location against endwise movement in their bearings, and to hold them central with respect to the axes of the associated cylinder bores and square to the cam track, and one object of the present invention is to provide an improved means for providing such endwise location with reduced rubbing losses.

According to the present invention, each roller is positioned between two axially-spaced guide rings which coaxially surround the cylinder block and provide positive endwise location for the roller, the guide rings being retained axially on the block by spring circlips or other retaining means, and the guide rings are a running fit on the cylinder block being freely rotatable thereon. Thus when one end of a roller comes into rubbing engagement with the adjacent guide ring at an eccentric region of the end face of the roller whilst rotating in its bearing recess, the guide ring is free to be rotated around the cylinder block by the roller, thus reducing the rubbing losses between the roller and the guide ring.

In the case of a multi-cylinder machine whose cylinders and their associated pistons and follower rollers are arranged in two axially-spaced banks, the two banks of follower rollers may be given endwise location by means of three of the guide rings only, two of the guide rings only being retained axially with respect to the cylinder block by circlip or like retaining means adjacent to the outer ends of the rollers of the respective banks, and the third guide ring being interposed between adjacent ends of the rollers of the two banks and not being provided with any other axial retaining means, but merely acting as a spacer between the roller banks.

Another object of the present invention is to improve the bearing arrangements for the cam follower rollers.

In a known construction of a hydrostatic motor or pump of this type, the casing of the machine which carries the cam track and encloses the cylinder block and the pistons is filled with hydraulic fluid, which is at low pressure when the machine is in use and which acts on the pistons to bias them radially inwardly, and also overcomes the inertia loads imposed on the pistons by external shocks in service, for example when the machine is a motor mounted within a wheel and is subject to vibrations when the wheel rolls over a rough surface. This low fluid pressure will not however prevent the rollers from leaving the pistons and striking the cam track when the motor is free-wheeling. It is a further object of the invention to provide a simple and effective means for preventing the follower rollers from leaving their bearing recesses under such conditions.

For this purpose, according to another aspect of the present invention, each cam follower roller is journalled in a plain bearing in its recess in the outer end of the associated piston, the bearing having a generally-cylindrical bearing surface which bears against the circumferential surface of the roller and which subtends an angle substantially greater than 180° but less than 360° at the axis of the roller, opposite sides of the bearing, extending partially around the outer semicircular half of the cross-sectional profile of the roller with their extremities spaced apart a distance less than the diameter of the roller, and so holding the roller in the recess in the piston.

In this way each cam follower roller is positively prevented from separating from the piston in the direction of piston reciprocation.

The bearing associated with each roller may comprise a part-cylindrical bearing shell lining the recess formed in the end of the piston, opposite sides of the bearing shell being backed by the skirts of the piston.

The invention may be carried into practice in various ways, but one specific embodiment of the invention will now be described by way of example only and with reference to the accompanying drawings, in which.

Figure 1:
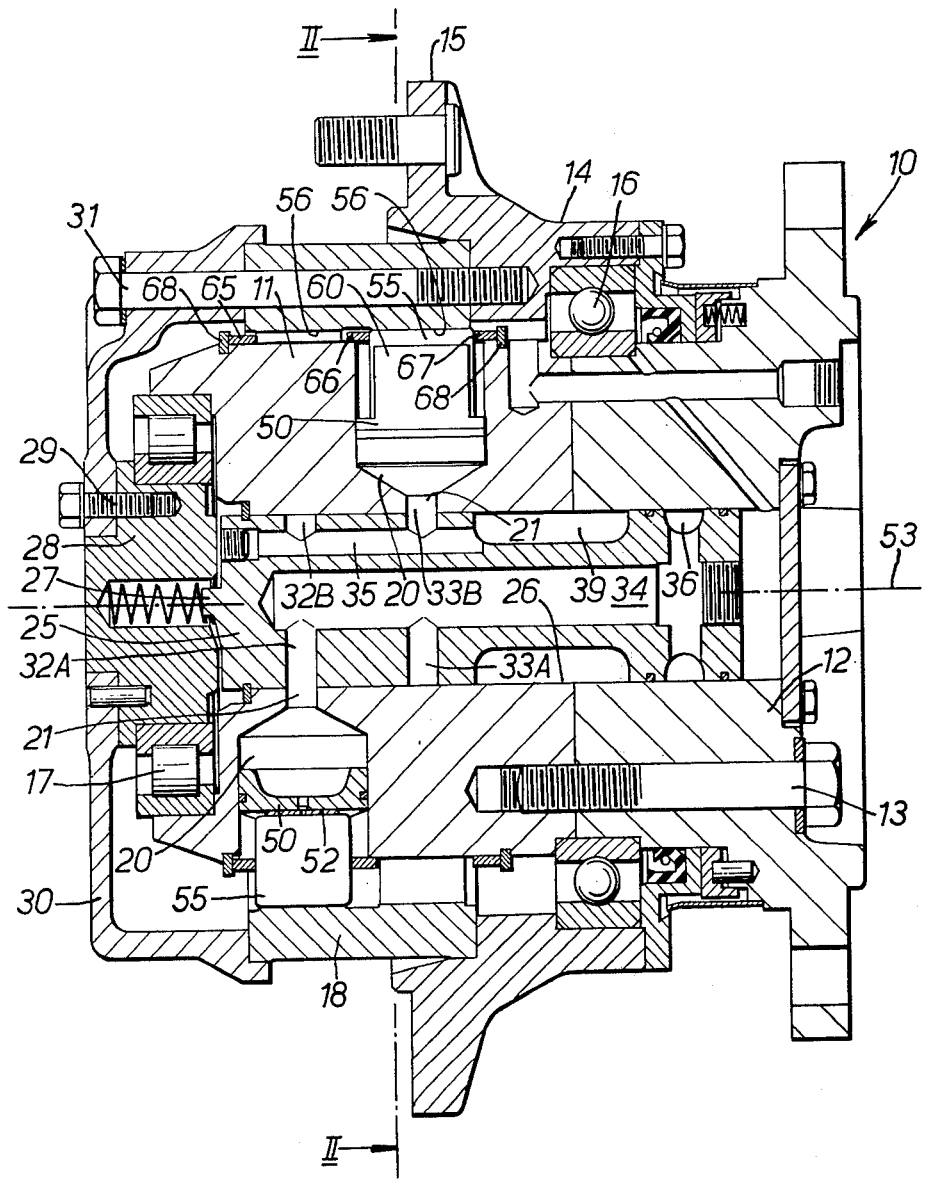
FIG. 1 is a longitudinal sectional view of a hydrostatic motor, the section line being indicated by the line I—I in FIG. 2.
Figure 2:
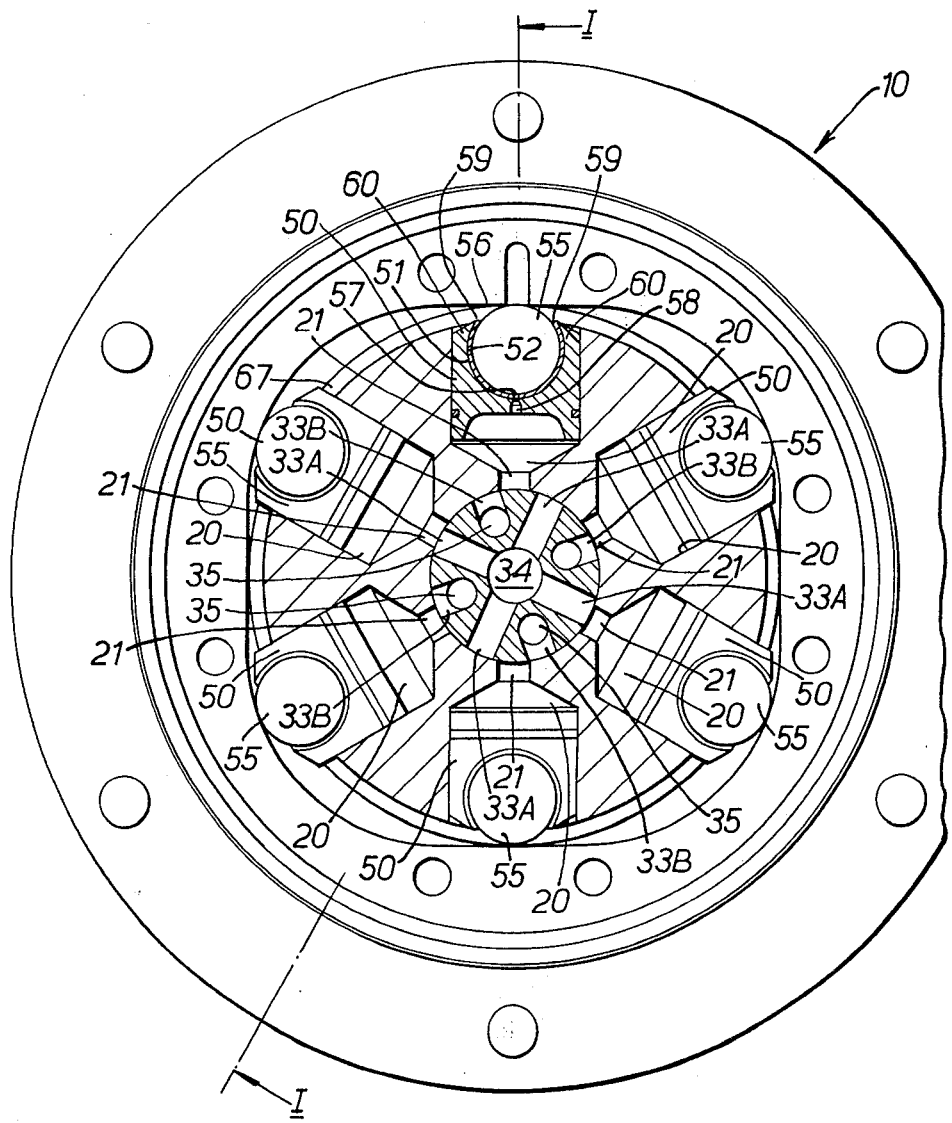
FIG. 2 is a cross-section on the line II—II of FIG. 1.
Figure 3:
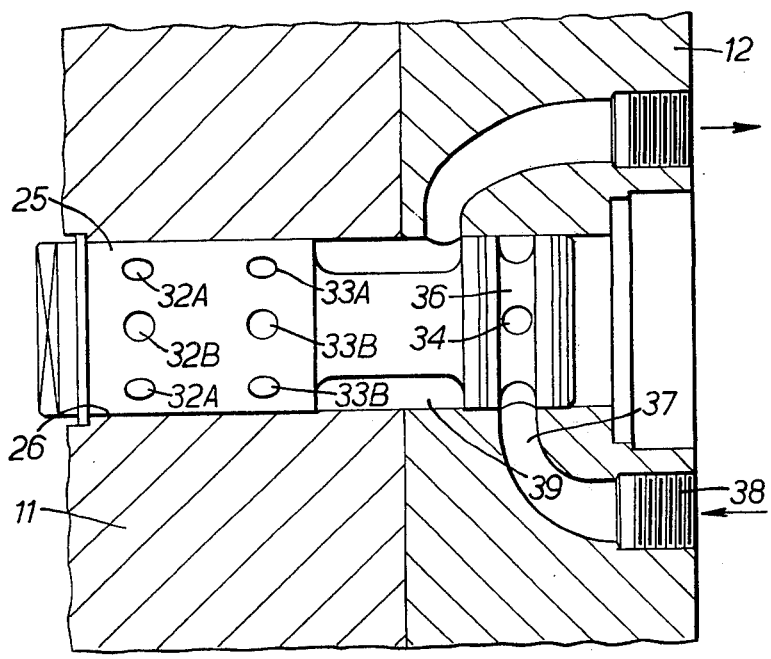
FIG. 3 is a fragmentary view showing the rotatable central pintle and porting arrangements of the motor.

In the illustrated embodiment there is shown a hydrostatic motor 10 suitable for the direct drive of a vehicle road or land wheel, the motor comprising a non-rotatable cylinder block 11 bolted to a back plate 12, by means of bolts 13, and a rotatable hub assembly 14 providing a wheel flange 15 to which a wheel can be bolted, the hub assembly 14 being rotatably mounted in bearings 16, 17 on the back plate 12 and cylinder block 11 and including a motor housing 18 which encloses the fixed cylinder block 11. The cylinder block 11 is formed with twelve radial cylinders 20, arranged in two axially-spaced banks each of six cylinders at 60° spacings, the cylinders 20 being open at their radially-outer ends and each being provided with an inlet and discharge port 21 at its inner end which co-operates with rings of ports formed in a pintle 25 rotatable with the hub assembly 14 in a coaxial central bore 26 in the cylinder block 11, whereby the cyclic admission and discharge of hydraulic fluid to and from the cylinders is controlled in known manner as the hub assembly rotates. The pintle 25 is a close fit in the bore 26 in which it rotates, the pintle being keyed at 27 to a central spigot block 28 bolted by bolts 29 to a dished end cover plate 30 of the hub assembly 14. The cover plate 30 is bolted by bolts 31 to the rotary housing 18 of the hub assembly, and its spigot block 28 is journalled by means of the bearing 17 in one end of the fixed cylinder block 11. The pintle 25 thus rotates with the hub assembly 14 in the bore 26 in the cylinder block. The pintle 25 is formed with two axially-spaced rings of ports, 32A, 32B and 33A, 33B which respectively co-operate with the ports 21 of the two banks of cylinders 20. The ports 32A and 32B alternate in their ring and are respectively connected to an inlet gallery 34 and to associated discharge galleries 35, all formed longitudinally in the pintle 25. The ports 33A and 33B also alternate in their ring and are respectively connected to the galleries 34 and 35, as shown. The central inlet gallery 34 leads into a circumferential groove 36 in the pintle surface, the groove 36 being in communication with a passage 37 formed in the back plate 12 and leading from an inlet port 38 for connection to a hydraulic pressure supply line, as shown in FIG. 3. The four discharge galleries 35 all lead into a common circumferential groove 39 formed in the pintle surface, the groove 39 being in communicatin with a discharge passage 40 formed in the back plate 12 and leading to a discharge port 41 for connection to a hydraulic fluid return line. Thus as the assembly 14 and the pintle 25 rotate relatively to the back plate 12 and cylinder block 11, the cylinder ports 21 are successively brought into alignment with the ports 32A, 32B, or 33A, 33C in the pintle and are thereby successively connected to the hydrostatic supply pressure and to the return pressure.

Slidable in each cylinder 20 is a cylindrical piston 50 formed in its outer end face with a concave recess 51 lined by a part-cylindrical bearing shell 52 whose axis extends parallel to the axis of rotation of the hub 53. Journalled in the bearing 52 in each piston 50 is a cylindrical roller 55, part of whose cylindrical surface protrudes outwardly from the piston bearing shell 52 and co-acts with a cam track 56 fixed in the motor housing 18 for rotation with the hub assembly 14, and surrounding the cylinder block 11. There are two such cam tracks 56, spaced apart axially and co-acting with the rollers 55 and pistons 50 of the two banks of cylinders 20 respectively. Each bearing shell 52 has a small lubrication port 57 in its base which communicates via a passage 58 through the recessed piston crown with the interior of the associated cylinder 20, whereby pressure fluid from the cylinder 20 is fed to the bearing 52 to lubricate its bearing surface.

Each piston 50 is retained in the associated cylinder 20 by a suitable detent (not shown) which limits its radially-outward movement relatively to the cylinder, and in addition fluid at low hydraulic pressure fills the interior of the housing 18 and acts on the pistons 50 to bias them radially inwardly. The rollers 55 are positively retained in their bearings 52 and prevented from separating radially from the pistons by the shape of the bearings themselves. Thus each bearing shell 52 subtends an angle of about 245° at the axis of the roller 55, and the opposite side portions of the bearing shell 52 extend partially around the outer cylindrical surface of the roller 55, as shown in the drawings. The spacing between the longitudinal edges 59 of the bearing shell 52 is thus less than the diameter of the roller 55 which is therefore trapped against leaving the shell in the radially-outward direction. The skirts 60 of the piston 50 are similarly formed to extend beyond the level of the axis of the roller, in the outward direction of piston reciprocation, and are inwardly-curved at their outwardly-extending portions to back up and support the bearing shell 52 where this wraps around the roller 55.

In this manner the follower rollers 55 are positively retained radially in their bearings and are prevented from leaving the pistons 50 and striking the cam tracks 56 during free-wheeling of the motor.

The follower rollers 55 are also provided with positive end location means to hold them centralised in their bearings with respect to the axes of their respective cylinder bores and square to the cam tracks 56. This end location means comprises three guide rings 65, 66, 67 which coaxially surround the cylinder block 11, of which the outer two rings 65 and 67 are located immediately adjacent to the outer ends of the rollers 55 of the respective cylinder banks, and the third ring 66 is interposed between the cylinder banks as a spacer between the two sets of rollers 55. The outer two guide rings 65 and 67 are axially retained by means of spring circlips 68 fitted outside them in circumferential grooves in the cylinder block, to hold the guide rings 65 and 67 in positions slightly overlapping the open ends of the cylinders 20, whilse the central ring 66 has no axial location means. All three of the guide rings 65, 66 and 67 are a free running fit on the cylinder block 11, so that they are freely rotatable to reduce rubbing losses between them and the rollers by reducing the relative speeds of sliding between the rollers and the guide rings when the rollers are rotating in their bearings 52. It will be seen that the three guide rings thus provide endwise location for the rollers without interfering significantly with the free reciprocation of the pistons and rollers as the latter coact with the cam tracks.

It will be understood that whilst in the embodiment described and illustrated the cylindrical surfaces of the rollers 55 and their bearing shells 52 are generated by straight lines, it would also be possible for the rollers to be slightly barrel-shaped, i.e. generated by curved generators, and for the cam tracks and possibly also the bearing shells to be correspondingly curved. The terms "cylindrical" and "part-cylindrical" as used herein are to be interpreted accordingly.

What I claim as my invention and desire to secure by Letters Patent is:

1. A rotary hydrostatic-pressure piston machine comprising a cylinder block and an annular cam track surrounding the cylinder block, one of which is rotatable relatively to the other, and reciprocating pistons slidable in generally radial directions in cooperating cylinders in the block and coacting with the cam track, in which each piston carries at its outer end a generally cylindrical cam follower roller rotatably housed in a bearing recess in the outer end of the associated piston in rolling engagement with the surrounding cam track, said cylinders and their associated pistons and follower rollers being arranged in two axially spaced banks in the cylinder block, means for providing positive endwise location for each of said rollers, said means comprising a pair of axially spaced guide rings which coaxially surround said cylinder block and are freely rotatable thereon, and a third guide ring freely rotatable on said cylinder block, said third guide ring being disposed between said axially sapced pluralities of rollers and said pair of rings being positioned on either side of said rollers and third guide ring arrangement, and means for axially retaining said guide rings on said block, said means comprising a pair of spring circlips disposed outside of said pair of guide rings on either side of said rollers and third guide ring arrangement, whereby said rollers and said third ring axially retain each other.

2. A rotary hydrostatic-pressure machine as claimed in claim 1, in which each roller is supported in a plain bearing in its recess in the outer end of the associated piston, the bearing having a part-cylindrical bearing surface which bears against the circumferential surface of the roller and which subtends an angle substantially greater than 180° but less than 360° at the axis of the roller so that opposite sides of the bearing extend partially around the outer semi-circular half of the cross-sectional profile of the roller with their extremities spaced apart, and so hold the roller in the recess in the piston.

3. A rotary hydrostatic-pressure machine as claimed in claim 2 in which the plain bearing associated with each roller comprises a part-cylindrical bearing shell lining the recess in the end of the piston, opposite sides of the bearing shell being backed by the skirts of the piston.

4. A rotary hydrostatic-pressure machine as claimed from claim 1 in which each roller is supported in a plain bearing in its recess in the outer end of the associated piston, the bearing having a part-cylindrical bearing surface which bears against the circumferential surface of the roller and which subtends an angle substantially greater than 180° but less than 360° at the axis of the roller so that opposite sides of the bearing extend partially around the outer semi-circular half of the cross-sectional profile of the roller with their extremities spaced apart, and so hold the roller in the recess in the piston.

5. A rotary hydrostatic-pressure machine as claimed from claim 4 in which the plain bearing associated with each roller comprises a part-cylindrical bearing shell lining the recess in the end of the piston, opposite sides of the bearing shell being backed by the skirts of the piston.

* * * * *

UNITED STATES PATENT OFFICE
CERTIFICATE OF CORRECTION

Patent No. 3,899,958                 Dated August 19, 1975

Inventor(s) Kenneth Morgan Spencer

It is certified that error appears in the above-identified patent and that said Letters Patent are hereby corrected as shown below:

The page containing columns 3 and 4 as shown on the attached sheet should be added, but will apply to the Letters Patent only.

Signed and Sealed this twentieth Day of January 1976

[SEAL]

Attest:

RUTH C. MASON
Attesting Officer

C. MARSHALL DANN
Commissioner of Patents and Trademarks formed with two axially-spaced rings of ports, 32A, 32B and 33A, 33B which respectively co-operate with the ports 21 of the two banks of cylinders 20. The ports 32A and 32B alternate in their ring and are respectively connected to an inlet gallery 34 and to associated discharge galleries 35, all formed longitudinally in the pintle 25. The ports 33A and 33B also alternate in their ring and are respectively connected to the galleries 34 and 35, as shown. The central inlet gallery 34 leads into a circumferential groove 36 in the pintle surface, the groove 36 being in communication with a passage 37 formed in the back plate 12 and leading from an inlet port 38 for connection to a hydraulic pressure supply line, as shown in FIG. 3. The four discharge galleries 35 all lead into a common circumferential groove 39 formed in the pintle surface, the groove 39 being in communicatin with a discharge passage 40 formed in the back plate 12 and leading to a discharge port 41 for connection to a hydraulic fluid return line. Thus as the assembly 14 and the pintle 25 rotate relatively to the back plate 12 and cylinder block 11, the cylinder ports 21 are successively brought into alignment with the ports 32A, 32B, or 33A, 33C in the pintle and are thereby successively connected to the hydrostatic supply pressure and to the return pressure.

Slidable in each cylinder 20 is a cylindrical piston 50 formed in its outer end face with a concave recess 51 lined by a part-cylindrical bearing shell 52 whose axis extends parallel to the axis of rotation of the hub 53. Journalled in the bearing 52 in each piston 50 is a cylindrical roller 55, part of whose cylindrical surface protrudes outwardly from the piston bearing shell 52 and co-acts with a cam track 56 fixed in the motor housing 18 for rotation with the hub assembly 14, and surrounding the cylinder block 11. There are two such cam tracks 56, spaced apart axially and co-acting with the rollers 55 and pistons 50 of the two banks of cylinders 20 respectively. Each bearing shell 52 has a small lubrication port 57 in its base which communicates via a passage 58 through the recessed piston crown with the interior of the associated cylinder 20, whereby pressure fluid from the cylinder 20 is fed to the bearing 52 to lubricate its bearing surface.

Each piston 50 is retained in the associated cylinder 20 by a suitable detent (not shown) which limits its radially-outward movement relatively to the cylinder, and in addition fluid at low hydraulic pressure fills the interior of the housing 18 and acts on the pistons 50 to bias them radially inwardly. The rollers 55 are positively retained in their bearings 52 and prevented from separating radially from the pistons by the shape of the bearings themselves. Thus each bearing shell 52 subtends an angle of about 245° at the axis of the roller 55, and the opposite side portions of the bearing shell 52 extend partially around the outer cylindrical surface of the roller 55, as shown in the drawings. The spacing between the longitudinal edges 59 of the bearing shell 52 is thus less than the diameter of the roller 55 which is therefore trapped against leaving the shell in the radially-outward direction. The skirts 60 of the piston 50 are similarly formed to extend beyond the level of the axis of the roller, in the outward direction of piston reciprocation, and are inwardly-curved at their outwardly-extending portions to back up and support the bearing shell 52 where this wraps around the roller 55.

In this manner the follower rollers 55 are positively retained radially in their bearings and are prevented from leaving the pistons 50 and striking the cam tracks 56 during free-wheeling of the motor.

The follower rollers 55 are also provided with positive end location means to hold them centralised in their bearings with respect to the axes of their respective cylinder bores and square to the cam tracks 56. This end location means comprises three guide rings 65, 66, 67 which coaxially surround the cylinder block 11, of which the outer two rings 65 and 67 are located immediately adjacent to the outer ends of the rollers 55 of the respective cylinder banks, and the third ring 66 is interposed between the cylinder banks as a spacer between the two sets of rollers 55. The outer two guide rings 65 and 67 are axially retained by means of spring circlips 68 fitted outside them in circumferential grooves in the cylinder block, to hold the guide rings 65 and 67 in positions slightly overlapping the open ends of the cylinders 20, whilst the central ring 66 has no axial location means. All three of the guide rings 65, 66 and 67 are a free running fit on the cylinder block 11, so that they are freely rotatable to reduce rubbing losses between them and the rollers by reducing the relative speeds of sliding between the rollers and the guide rings when the rollers are rotating in their bearings 52. It will be seen that the three guide rings thus provide endwise location for the rollers without interfering significantly with the free reciprocation of the pistons and rollers as the latter coact with the cam tracks.

It will be understood that whilst in the embodiment described and illustrated the cylindrical surfaces of the rollers 55 and their bearing shells 52 are generated by straight lines, it would also be possible for the rollers to be slightly barrel-shaped, i.e. generated by curved generators, and for the cam tracks and possibly also the bearing shells to be correspondingly curved. The terms "cylindrical" and "part-cylindrical" as used herein are to be interpreted accordingly.

What I claim as my invention and desire to secure by Letters Patent is:

1. A rotary hydrostatic-pressure piston machine comprising
   a cylinder block and an annular cam track surrounding the cylinder block, one of which is rotatable relatively to the other, and reciprocating pistons slidable in generally radial directions in cooperating cylinders in the block and coacting with the cam track, in which each piston carries at its outer end a generally cylindrical cam follower roller rotatably housed in a bearing recess in the outer end of the associated piston in rolling engagement with the surrounding cam track, said cylinders and their associated pistons and follower rollers being arranged in two axially spaced banks in the cylinder block,
   means for providing positive endwise location for each of said rollers, said means comprising a pair of axially spaced guide rings which coaxially surround said cylinder block and are freely rotatable thereon, and a third guide ring freely rotatable on said cylinder block, said third guide ring being disposed between said axially sapced pluralities of rollers and said pair of rings being positioned on either side of said rollers and third guide ring arrangement, and
   means for axially retaining said guide rings on said block, said means comprising a pair of spring circlips disposed outside of said pair of guide rings on